United States Patent [19]

Mano

[11] Patent Number: 5,187,705
[45] Date of Patent: Feb. 16, 1993

[54] DATA ERROR DETECTING APPARATUS FOR KEY TELEPHONE SYSTEM AND THE DETECTING METHOD THEREFOR

[75] Inventor: Hiroshi Mano, Hino, Japan

[73] Assignee: Kabushiki Kaisha Toshiba, Kawasaki, Japan

[21] Appl. No.: 641,930

[22] Filed: Jan. 16, 1991

[30] Foreign Application Priority Data

Jan. 17, 1990 [JP] Japan .................................. 2-7542

[51] Int. Cl.⁵ .............................................. H04J 1/16
[52] U.S. Cl. ...................................... 370/15; 370/13; 379/5
[58] Field of Search .................. 370/13, 13.1, 14, 15; 379/5, 16; 371/20.4, 20.5

[56] References Cited

U.S. PATENT DOCUMENTS

| | | | |
|---|---|---|---|
| 4,688,208 | 8/1987 | Kawaguchi | 370/16 |
| 4,860,281 | 8/1989 | Finley et al. | 379/5 |
| 4,961,180 | 10/1990 | Schwarz et al. | 370/13 |
| 4,989,202 | 1/1991 | Soto et al. | 370/13 |

Primary Examiner—Douglas W. Olms
Assistant Examiner—Shick Hom
Attorney, Agent, or Firm—Foley & Lardner

[57] ABSTRACT

An apparatus for executing loop-back tests in a key service unit (50) of a key telephone system, including an ISDN interface unit (2) connected to an ISDN (30) is disclosed. When any one of speech channels of the ISDN (30) is not used, a predetermined test pattern data is transmitted through a time slot of the down-stream speech highway (3b) allocated to the unused speech channel to the ISDN interface unit (2). Then the test pattern data is returned back in the ISDN interface unit (2) and transmitted to a time slot of the up-stream speech highway (3a) allocated to the unused speech channel. The test pattern data transmitted to the up-stream speech highway is compared with the original test pattern data for executing the loop-back test.

8 Claims, 6 Drawing Sheets

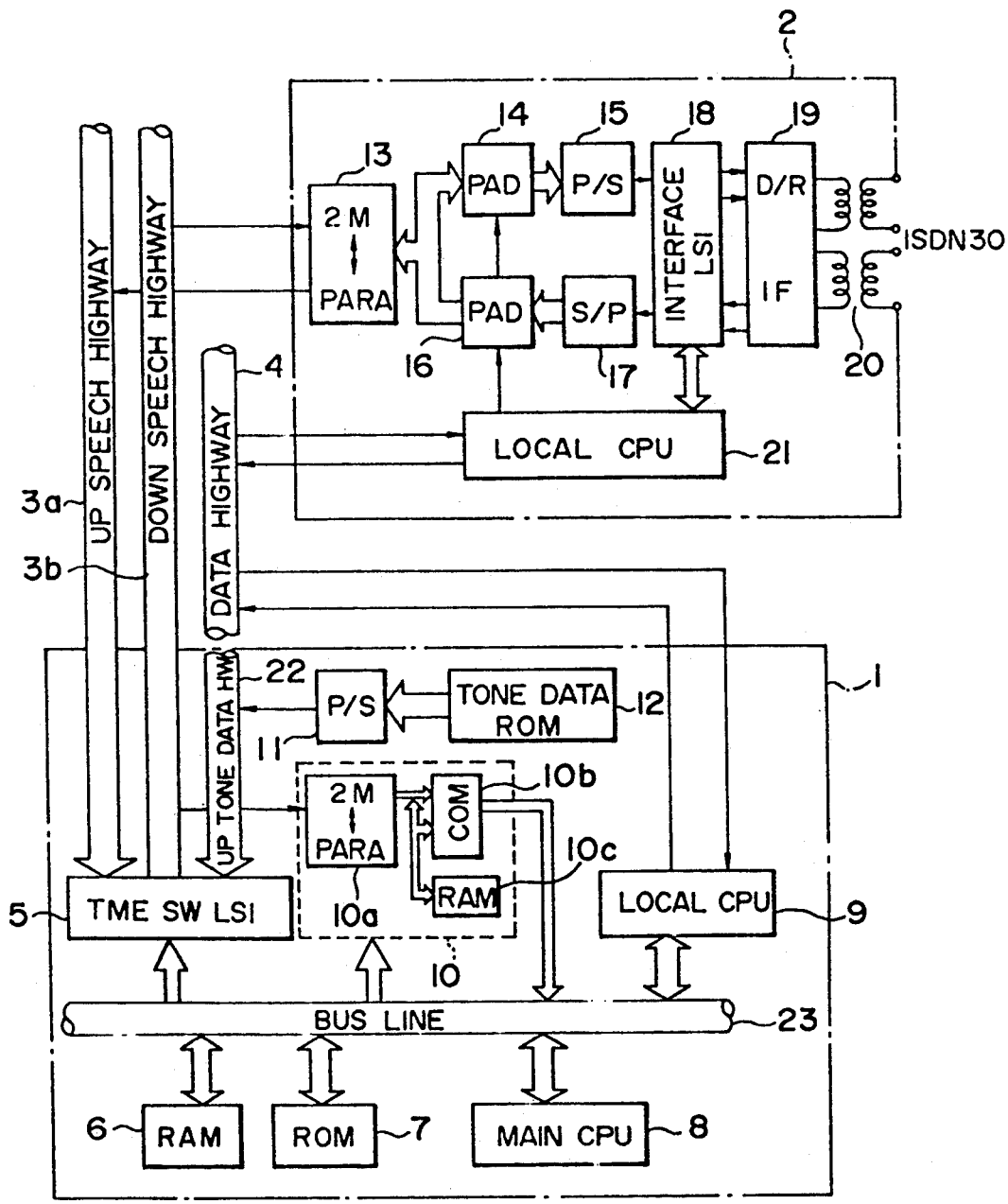
F I G. 2

DATA ERROR DETECTING APPARATUS FOR KEY TELEPHONE SYSTEM AND THE DETECTING METHOD THEREFOR

BACKGROUND OF THE INVENTION

The present invention relates generally to a data error detecting apparatus for a key telephone system and the detecting method therefor, and more specifically to an apparatus and a method of detecting data errors generated in a key telephone system connectable to an Integrated Service Digital Network (referred to as ISDN, hereinafter).

With the development of the ISDN recently, an ISDN interface unit is usually provided in a key service unit of a key telephone system for connection between the ISDN and the key telephone system. The above-mentioned ISDN interface unit transmits digitalized speech signals or data signals given through a telephone office line (i.e. digital outside line), without conversion into analog signals, to the key service unit, to which a plurality of terminal devices (e.g. key telephone sets) are connected. In addition, the ISDN interface unit can transmit digitalized speech signals or data signals given from the terminal devices through the key service unit to the office line without conversion into analog signals.

In case an error is detected in the data transmitted to the key service unit, a test (referred to as a loop-back test) is made for each transmission line in the system, in order to locate the position at which the data error occurs within the key service unit and peripheral devices thereof, as described in further detail below. In the loop-back test, a tester (referred to as a loop-back tester) is first connected to a location to be tested of the key service unit; secondly, random data (e.g. 511 random pattern data) is transmitted from the loop-back tester to the test location; the random data transmitted to the test location is compared with that returned from the test location by the loop-back tester; and the occurrence of data error at the test location is detected when the data do not match with each other.

In the conventional data error detecting method, however, the locations to be loop-back tested are limited to locations to which the loop-back tester can be connected from the outside of the key service unit, for instance such as terminals of the ISDN interface unit. In more detail, when the loop-back tester is connected to a terminal of the ISDN interface unit from the outside of the key service unit, it is possible to detect the occurrence of data error generated in a transmission line between the loop-back tester and a return point in the ISDN interface unit (from which a test data transmitted from the tester is returned). In the conventional test method, however, there exists a problem in that it is impossible to detect the occurrence of data error generated due to trouble at locations other than the ISDN interface unit within the key service unit, for instance such as an up-stream speech highway, a down-stream speech highway, etc. In addition, whenever the conventional loop-back test is made, since it has been necessary to stop the service or operation of the key telephone system, there exists another problem in that it is impossible to perform the loop-back test at any time when required.

SUMMARY OF THE INVENTION

With these problems in mind, therefore, it is the primary object of the present invention to make it possible to execute the loop-back test for the key telephone system without stopping the service of the key telephone system, and to make it possible to reliably detect whether data error occurs or not within the key service unit having an ISDN interface unit.

To achieve the above-mentioned object, the present invention provides an apparatus for detecting data errors occurring in a key service unit of a key telephone system connectable to an ISDN, the key service unit including up-stream and down-stream speech highways each having a plurality of time slots including time slots allocated to speech channels of the ISDN; a time switch for transferring data from each time slot of the up-stream speech highway to each time slot of the down-stream speech highway; an ISDN interface unit provided between the ISDN and the up-stream and down-stream speech highways, for transmitting data received from the speech channels of the ISDN to the time slots of the up-stream speech highway allocated to the speech channels and transmitting data received from the time slots of the down-stream speech highway allocated to the speech channels to the speech channels of the ISDN, which comprises:

(a) detecting means for detecting an unused speech channel of the speech channels of the ISDN;

(b) test starting means for generating a loop-back test start signal;

(c) data outputting means responsive to the loop-back test start signal, for outputting a predetermined test data to the time slot of the down-stream speech highway allocated to the unused speech channel detected by said detecting means;

(d) loop-back route forming means responsive to the loop-back test start signal, for forming in the ISDN interface unit a loop-back route through which the test data received from the time slot of the down-stream speech highway allocated to the unused speech channel are transmitted to the time slot of the up-stream speech highway allocated to the unused speech channel; and (e) discriminating means for storing test data the same as the test data outputted from said test data outputting means and discriminating whether data error occurs or not by receiving the test data transmitted to the up-stream speech highway through the loop-back route and by comparing the received test data with the stored test data.

BRIEF DESCRIPTION OF THE DRAWINGS

FIG. 2 is a schematic block diagram showing an embodiment of the data error detecting apparatus according to the present invention incorporated in a key service unit of the key telephone system shown in FIG. 1;

DESCRIPTION OF THE PREFERRED EMBODIMENTS

An embodiment of the present invention will be explained in detail with reference to the attached drawings.

Figure 1:
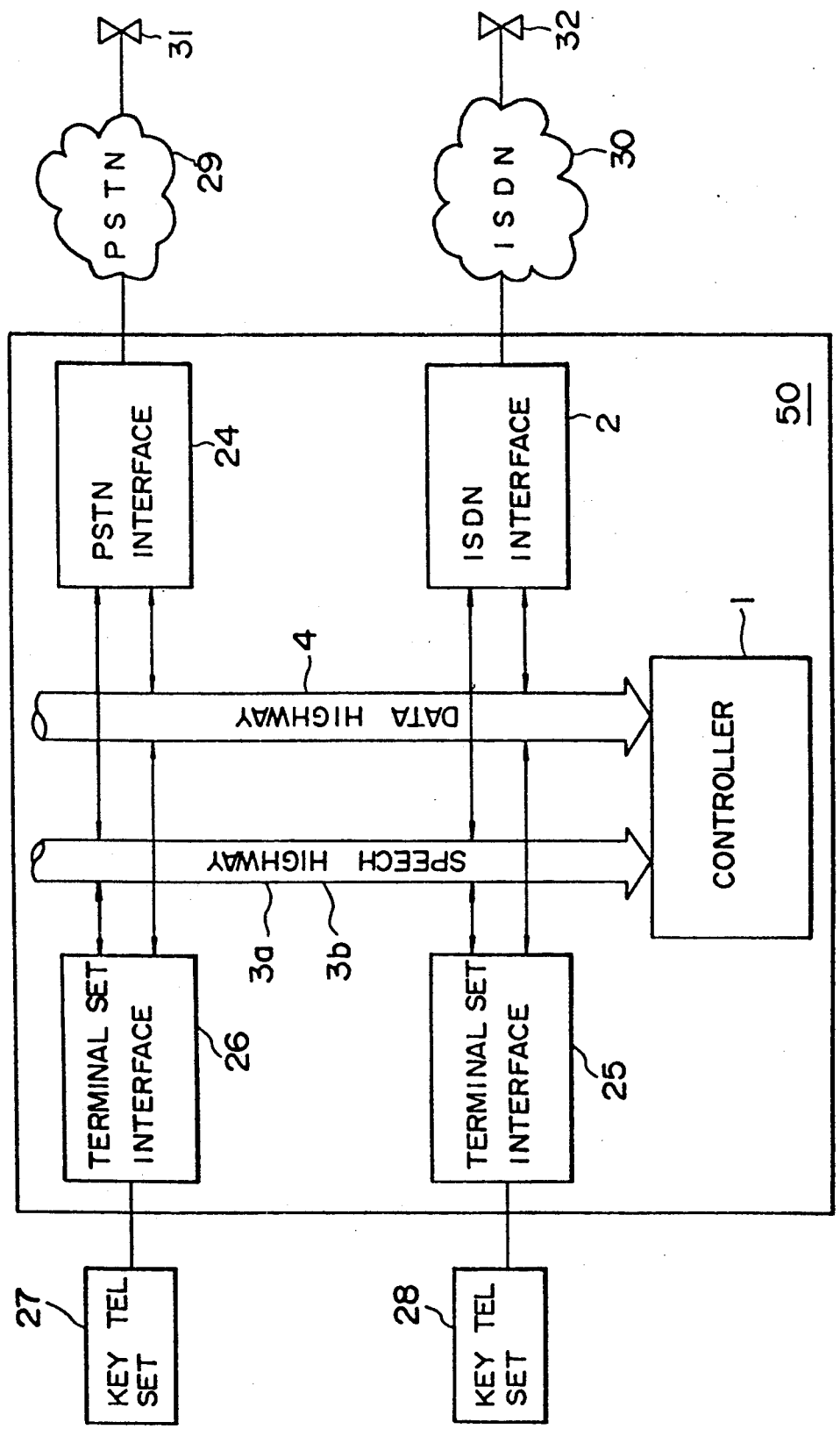
FIG. 1 is a schematic block diagram showing an overall system configuration of the key telephone system.

FIG. 1 is a block diagram showing an overall system configuration of a key telephone system connectable to ISDN and PSTN (public subscriber telephone network), to which the data error detecting apparatus according to the present invention can be preferably applied. The system shown in FIG. 1 comprises a key service unit (main controller) 50 connected to a plurality of key telephone sets 27, 28 and the ISDN 30 and the PSTN 29, respectively. The key service unit 50 includes a controller 1, up-stream and down-stream speech highways 3a and 3b, a data highway 4, an ISDN interface unit 2, a PSTN interface unit 24, and terminal telephone set interface units 25 and 26. The ISDN interface unit 2 is connected directly to the ISDN 30 and to the controller 1 via the up-stream and down-stream speech highways 3a and 3b and the data highway 4. The PSTN interface unit 24 is also connected between the PSTN 31 and the controller 1 in the same way. The two key telephone sets interface units 25 and 26 are connected directly to the two key telephone sets 27 and 28, respectively, and to the controller 1 via the above-mentioned three highways 3a, 3b and 4.

FIG. 2 shows an embodiment of the data error detecting apparatus incorporated in the key service unit 50 shown in FIG. 1. In FIG. 2, the same reference numerals as in FIG. 1 have been retained for the same parts.

Each composing element arranged in the ISDN interface unit 2 will be first described hereinbelow. In FIG. 2, a driver/receiver interface circuit (referred to as D/R IF circuit) 19 is provided with binary-ternary conversion function. In more detail, the D/R IF circuit 19 receives binary signals (e.g. in NRZ (Non-Return to Zero) code mode) from an interface LSI 18, converts the received binary signals into ternary signals (e.g. in AMI (Alternate Mark Inversion) code mode), and outputs the converted signals to a transformer 20. Further, the D/R IF circuit 19 receives ternary signals (in AMI code) from the transformer 20, converts the received ternary signals into binary signals (NRZ code), and then outputs the converted signals to the interface LSI 18. The transformer 20 serves to couple a terminal line of the ISDN 30 to the ISDN interface unit 2. The interface LSI 18 controls the Layer 1, Layer 2 and Layer 3 for communication of digital signals between the ISDN interface unit 2 and the ISDN 30 (shown in FIG. 1) under control of the local CPU 21.

Figure 3:
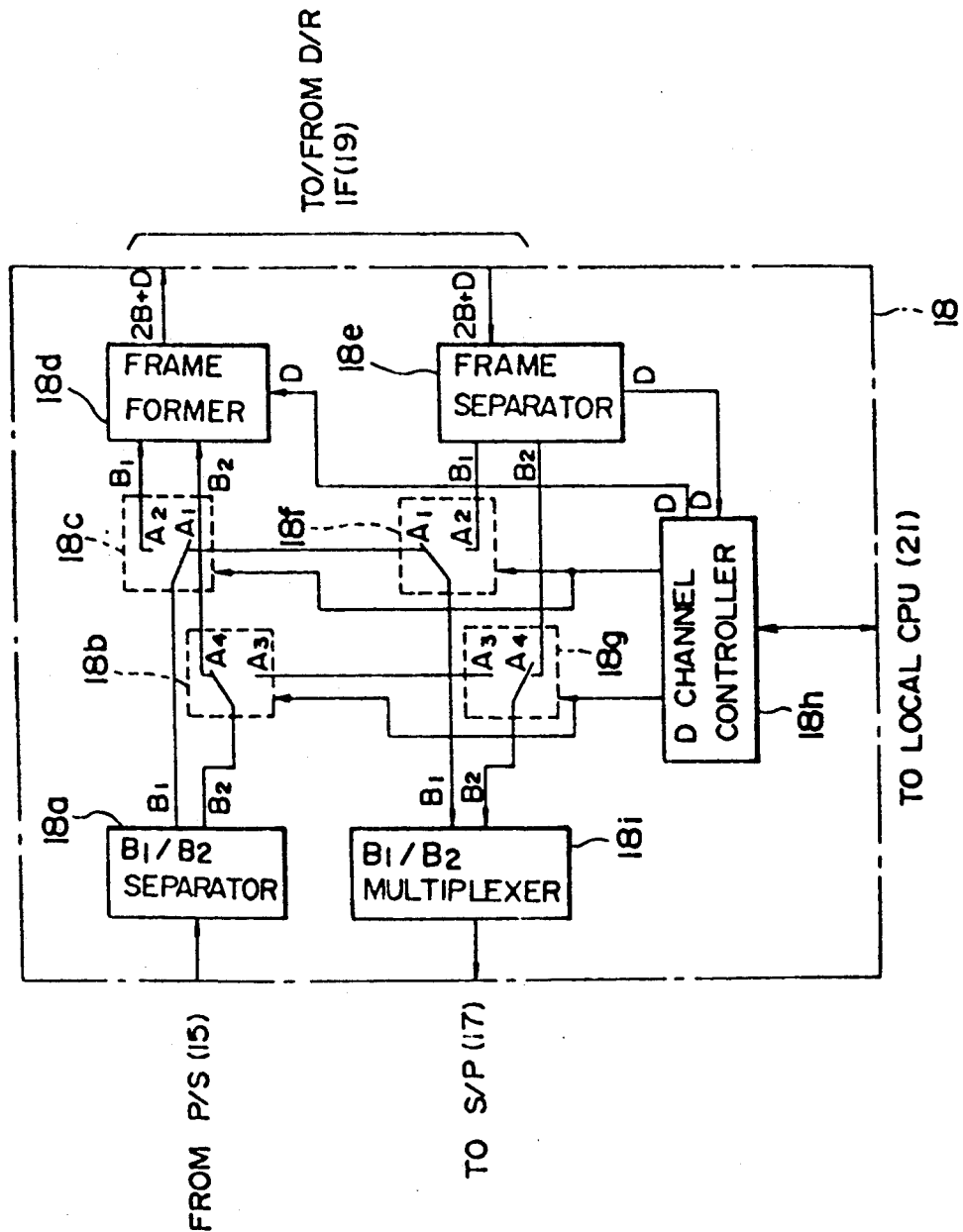
FIG. 3 is a schematic block diagram showing an internal configuration of an interface LSI shown in FIG. 2.

Here, the internal configuration of the interface unit LSI 18 will be explained with reference to FIG. 3. A B1/B2 separator 18a receives PCM (Pulse Code Modulation) speech signals B1 and B2, which are allocated two speech channels B1, B2 of ISDN 30, from the down-stream speech highway 3b, via a parallel/series (P/S) circuit 15. These speech signals B1 and B2 are time-division multiplexed serial data. The B1/B2 separator 18a receives and separates these time-shared speech data B1 and B2, and outputs the first speech data B1 to a speech line change-over switch 18c and the second speech data B2 to a speech line change-over switch 18b, respectively. The speech line change-over switch 18c connects a data-B1 output terminal of the B1/B2 separator 18a selectively to a contact A2 connected to a data-B1 input terminal of a frame former 18d or to a contact A1 connected to a change-over switch 18f, under control of a D-channel controller 18h.

On the other hand, the speech line change-over switch 18b connects a data-B2 output terminal of the B1/B2 separator 18a selectively to a contact A4 connected to a data-B2 input terminal of the frame former 18d or to a contact A3 connected to a change-over switch 18g, under control of the D-channel controller 18h.

The frame former 18d combine the two-channel speech data B1 and B2 from the B1/B2 separator 18a and a control data D from the D-channel controller 18h to form a channel frame in 2B+D fashion, and transmits the frame to the D/R IF circuit 19, from which the frame is transmitted to the ISDN 30.

A frame separator 18e receives a channel frame in 2B+D fashion from the ISDN 30 via the D/R IF circuit 19, and separates the frame into B1-channel speech data B1, B2-channel speech data B2, and D-channel control data D. The separated speech data B1 and B2 are applied to speech line change-over switches 18f and 18g, respectively. The separated control data are applied to the D-channel controller 18h.

A speech change-over switch 18f selectively connects either a contact A2 connected to a data-B1 output terminal of the frame separator 18e or a contact A1 connected to the change-over switch 18c to a data-B1 input terminal of a B1/B2 multiplexer 18i, under control of the D-channel controller 18h.

A speech line change-over switch 18g selectively connects either a contact A4 connected to a data-B2 output terminal of the frame separator 18e or a contact A3 connected to the change-over switch 18b to a data-B2 input terminal of the B1/B2 multiplexer 18i, under control of the D-channel controller 18h.

The B1/B2 multiplexer 18i converts the inputted speech data B1 and B2 into a serial data line by time-division multiplex conversion, and then outputs these data to a S/P circuit 17.

The D-channel controller 18h receives control data from the frame separator 18e, and transmits the data to the local CPU 21 which transmits the data to the controller 1 via the data highway 4. Further, the D-channel controller 18h receives control data from the controller 1 via the data highway 4 and the local CPU 21. Where the received control data are call processing data related to the ISDN 30, these data are transmitted to the frame separator 18e. On the other hand, where the received control data are data related to loop-back test, the change-over switches 18b, 18c, 18f and 18g are controlled on the basis of the data. For instance, when a loop-back test is executed for the B1 channel, the change-over switches 18c and 18f are set as shown in FIG. 3, so that the speech data B1 outputted from the B1/B2 separator 18a are returned and inputted to the B1/B2 multiplexer 18i. This state is referred to as a loop-back test mode. On the other hand, when the loop-back test is not being executed for the B2 channel, the change-over switches 18b and 18g are set as shown in FIG. 3, so that the speech data B2 from the B1/B2 separator 18a are transmitted to the frame former 18d, and the speech data B2 from the frame separator 18e are transmitted to the B1/B2 multiplexer 18i. This mode is referred to as a service mode. It is possible to switch the loop-back test mode to the service mode or vice versa for each channel.

With reference to FIG. 2 again, the P/S circuit 15 receives the speech data B1, B2 in parallel data fashion from the digital pad 14 and converts the parallel speech data into time-division multiplexed serial data, and outputs these serial data to the interface LSI 18. The digital pad 14 receives the parallel speech data from a 2M/parallel converter 13, adjusts the data level (i.e. speech sound level) of the parallel speech data at an appropriate level, and outputs the adjusted parallel speech data to the P/S circuit 15. The attenuation rate of the digital pad 14 is adjustable under control of the local CPU 21.

A S/P circuit 17 receives the speech data B1, B2 in serial data fashion from the interface LSI 18, converts these serial speech data into parallel speech data, and transmits the parallel speech data to a digital pad 16. The digital pad 16 receives the parallel speech data from the S/P circuit 17, adjusts the data level (i.e. speech sound level) of the parallel speech data at an appropriate level, and outputs the adjusted parallel speech data to the 2M/parallel converter 13. The attenuation rate of the digital pad 16 is also adjustable under control of the local CPU 21.

The 2M/parallel converter 13 receives time-division multiplexed serial speech data with a speed of 2M bits/s from the down-stream speech highway 3b, converts these serial speech data into parallel speech data, and outputs these parallel speech data to the digital pad 14. Further, the 2M/parallel converter 13 receives parallel speech data from the digital pad 16, converts these parallel speech data into time-division multiplexed serial speech data with a speed of 2M bits/s, and outputs these serial speech data to the up-stream speech highway 3a.

As already explained, the local CPU 21 controls the operation of the interface LSI 18 and attenuation rate of digital pads 14 and 16. In more detail, the local CPU 21 receives and transmits control data from and to a main CPU 8 via the data highway 4, the local CPU 9 and a microcomputer bus line 23. For instance, when a control data indicative of switching of the interface LSI 18 from the loop-back test mode to the service mode is given from the main CPU 8 to the local CPU 21, the local CPU 21 outputs a control signal to the interface LSI 18 to set the interface LSI 18 to the service mode. Further, when a control data indicative of switching of the interface LSI 18 from the service mode to the loop-back test mode is given from the main CPU 8 to the local CPU 21, the local CPU 21 outputs a control signal to the interface LSI 18 to set the interface LSI 18 to the loop-back test mode. Furthermore, when the local CPU 21 recognizes a call incoming from the outside ISDN line via the transformer 20, D/R IF circuit 19, and interface LSI 18, the local CPU 21 outputs a control data indicative of a call incoming to the main CPU 8 via the data highway 4, local CPU 9 and microcomputer bus line 23.

The configuration of the controller 1 will be described in detail hereinbelow with reference to FIG. 2.

A local CPU 9 is provided for controlling communications in the same way as the local CPU 21 incorporated in the ISDN interface unit 2. This local CPU 9 controls data communication between the data highway 4 and the main CPU 8. A ROM 7 stores various programs for controlling various operations of this key telephone system. One of these programs stored in the ROM 7 is a loop-back test program executed by the main CPU 8 to periodically perform loop-back tests. As described in more detail later, this loop-back test program is so set as to be periodically executed in response to a timer interrupt signal.

A RAM 6 is provided for executing read/write operation of various data at any given timing on the basis of control signals transmitted from the main CPU 8 via the microcomputer bus line 23. In more detail, a table is provided in a memory area within the RAM 6 in order to indicate idle/busy states of the two speech channel (ports) B1, B2 of the ISDN, that is, whether each speech channel is serviceable or not. At the beginning of the loop-back test, the main CPU 8 checks the contents (idle/busy) of the table. That is, this idle/busy table is provided with flags each indicative of the idle/busy state of each speech channel. Each flag is set whenever the main CPU 8 recognizes the busy state due to a call incoming, a call originating or a conversation, and reset whenever the main CPU 8 recognizes that the state of each speech channel is changed from the busy state to the idle state (i.e. a call waiting state).

Figure 4:
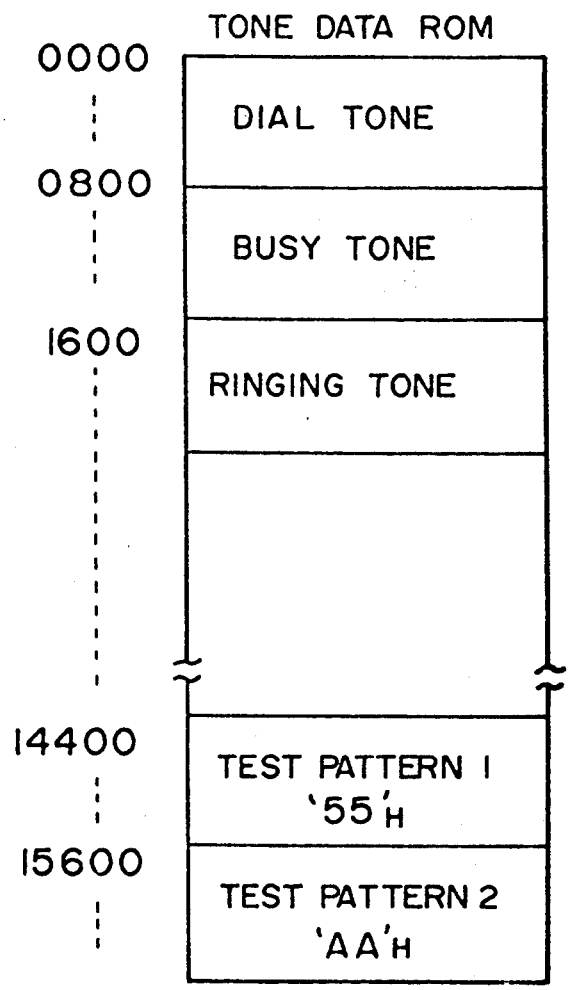
FIG. 4 is an illustration explaining memory areas in a tone data ROM shown in FIG. 2.

A tone data ROM 12 is provided with a memory area divided into 32 memory locations so that tone data of thirty-two kinds can be stored in correspondence to the fact that thirty-two time slots are set on an up-stream tone data highway 22. FIG. 4 shows an example of the thirty-two memory locations within the tone data ROM 12, in which various tone data such as dial tone data, busy tone data, ringing tone data, etc., loop-back test data such as test pattern 1, test pattern 2, etc. are written eight hundred steps by eight hundred steps. This eight hundred steps (0.1 sec in the case of a sampling frequency of 8 kHz) indicate a least common multiple of each period of various tone data. Therefore, where tone data with another different period are added, since the number of steps is different from eight hundred steps, the number of steps is not necessarily fixed to eight hundred steps all the time. Further, data of 00 (no tone) is stored in the remaining unused locations of the thirty-two-divided memory locations. In the case of the tone data shown in FIG. 4, a fixed pattern "55" is adopted as the test pattern data 1 and a fixed pattern "AA" is adopted as the test pattern data 2, respectively. Further, in FIG. 4, a sign H indicates a hexadecimal rotation; "55" indicates 0101/0101; "AA" indicates 1010/1010. In the above embodiment, although fixed pattern data are used as the test pattern data 1 and 2, respectively, it is of course possible to use a random pattern data such as "511" instead of these fixed pattern data.

The tone data ROM 12 always outputs the tone data of dial tone data, busy tone data, ringing tone data, etc. to the P/S (parallel/serial) circuit 11 in parallel data fashion. Further, the tone data ROM 12 always outputs the fixed test pattern data 1 and 2 to the P/S circuit 11 in parallel data fashion. The P/S circuit 11 converts various tone data and the test patterns 1 and 2 into 8-bit serial signals, and then outputs the converted serial signals to the up-stream tone-data highway 22. In the up-stream tone data highway 22, thirty-two time slots per frame (8-bit serial signals are allocated to one time slot) are set in time division mode by a time switch 5, which executes time-division switching connections under control of the main CPU 8. Various tone data and two test pattern data 1 and 2 outputted from the P/S circuit 11 are allocated to the thirty-two time slots in predetermined relationship so as to correspond to each other.

A comparison section 10 is composed of a 2M/parallel converter 10a similar to the 2M/parallel converter 13 of the ISDN interface unit 2, a comparator 10b, and a RAM 10c. The 2M/parallel converter 10a accesses to one time slot of the down-stream speech highway 3b allocated to the comparison section 10. Therefore, when the time switch LSI 5 connects the time slot allocated to the pattern data 1 (or 2) of the up-stream tone data highway 22 to the time slot allocated to the comparison section 10 of the down-stream speech highway 3b, the 2M/parallel converter 10a receives the test pattern data 1 (or 2). Further, when the time switch 5 connects the time slot allocated to the ISDN speech channel B1 (or B2) of the up-stream tone data highway 3a to the time slot allocated to the comparison section 10 of the down-stream speech highway 3b, the 2M/parallel converter 10a receives speech data B1 (or B2) outputted from the interface LSI 18. The 2M/parallel converter 10a converts the received serial data into parallel data, and then outputs the parallel data.

The RAM 10c is controlled by control signals outputted from the main CPU 8 via the microcomputer bus line 23. When set to a write mode, the RAM 10c stores data outputted from the 2M/parallel converter 10a. As described later, this RAM 10c is used to store the test pattern data 1 (or 2) outputted from the tone data ROM 12. Further, when set to a read mode, the RAM 10c outputs the stored test pattern data 1 (or 2) to the comparator 10b. Under control of control signals outputted from the main CPU 8 via the microcomputer bus line 23, the comparator 10b compares the test pattern data 1 (or 2) received from the RAM 10c with the data received from the 2M/parallel converter 10a, while the RAM 10c is set in the read mode. As described later, the data received by the comparator 106 from the 2M/parallel converter 10a is the test pattern data 1 (or 2) returned from the interface LSI 18 in loop-back test mode. The comparator 10b compares bit by bit all the bits between the stored pattern data and the returned pattern data. When all the corresponding bits match with each other, the comparator 10b outputs a signal indicative of no data error to the main CPU 8 via the microcomputer bus line 23. When even only one bit of all the corresponding bits of both the pattern data mismatches with each other, the comparator 10b outputs a signal indicative of data error to the main CPU 8 via the microcomputer bus line 23.

Here, the difference in function between the up-stream speech highway 3a and the down-stream speech highway 3b will be explained hereinbelow. The up-stream speech highway 3a transmits PCM coded speech data given from the key telephone sets 27 and 28 via the terminal telephone set interface units 26 and 25 and PCM coded speech data given from the ISDN via the ISDN interface unit 2, to the time switch 5 of the control unit 1. On the other hand, the down-stream speech highway 3b transmits PCM coded speech data given from the time switch 5 of the controller 1 to the terminal telephone set interface units 26 and 25 and the ISDN interface unit 2. In both the up-stream and down-stream speech highways 3a and 3b, thirty-two time slots per frame are set in time division fashion by the time switch 5, respectively. Further, each time slot of the up-stream speech highway 3a can be connected to each time slot of the down-stream speech highway 3b by the time switch 5. Furthermore, two speech channels of the ISDN are allocated to two predetermined time slots of the up-stream and down-stream speech highways 3a and 3b.

The time switch 5 executes time-division switching or connection functions under control of the main CPU 8, as described in further detail below. That is, the time switch 5 transfers data from each of the time slots of the up-stream tone data highway 22 to each of the time slots of the down-stream speech highway 3b on the basis of control signals outputted from the main CPU 8. Additionally, the time switch 5 transfers data from each of the time slots of the up-stream speech highway 3a to each of the time slots of the down-stream speech highway 3b.

Figure 5:
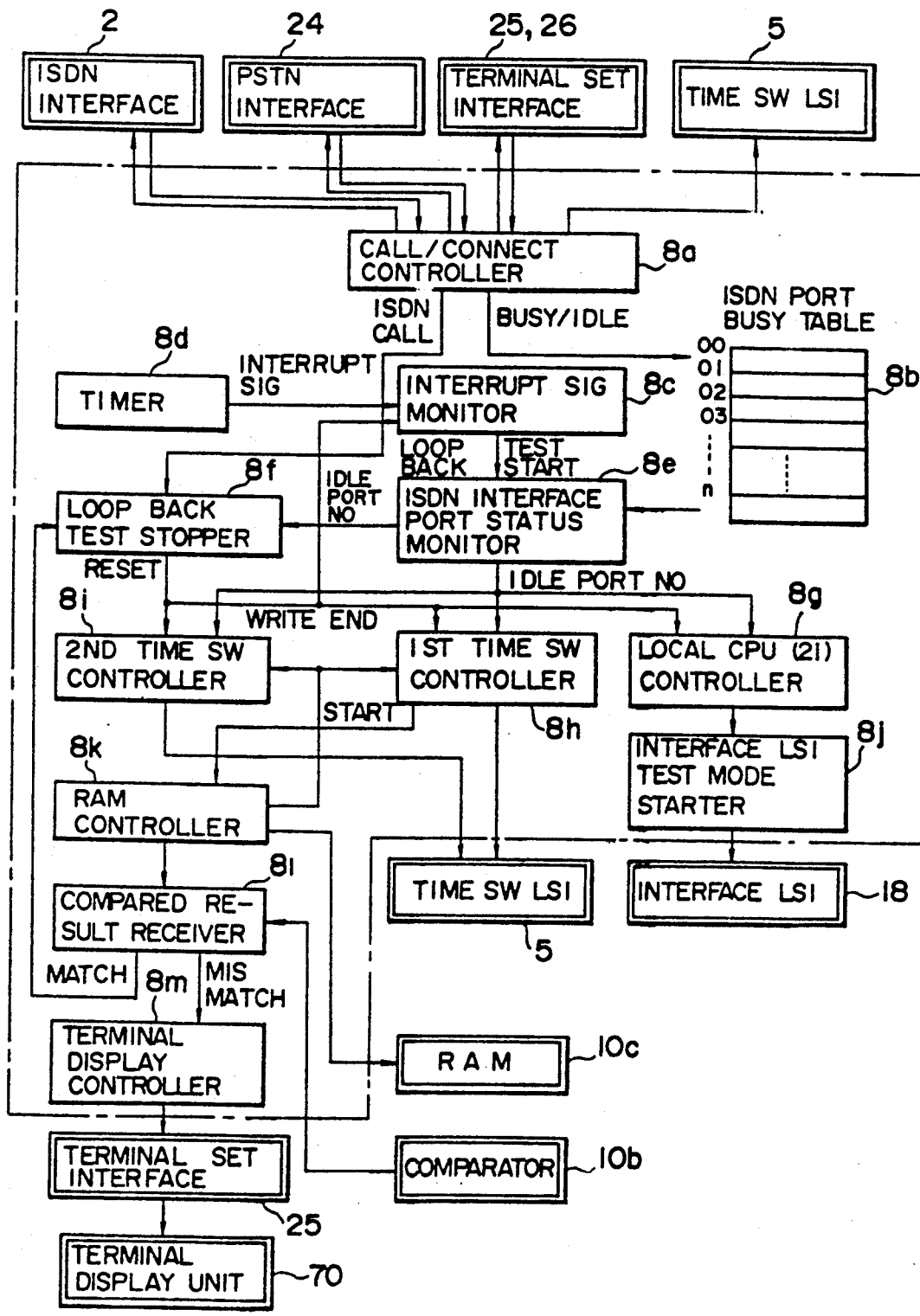
FIG. 5 is a block diagram showing functional composing elements of the main CPU shown in FIG. 2.

FIG. 5 shows various functions executed by the main CPU 8 in accordance with programs stored in the ROM 7.

In FIG. 5, a call processing/connection controller 8a executes call processing, when the controller 8a receives control data indicative of a call incoming from the PSTN interface unit 24 or from the ISDN interface unit 2 or receives control data indicative of a call originating from the terminal telephone set interface unit 25 or 26 via the data highway, and further controls the time switch LSI 5 when receives control data indicative of a terminal response to call or control data indicative of the end of conversation from either of the interface units 2, 24, 25 and 26. When a call processing related to the ISDN, that is, a call processing due to a call incoming from the ISDN 30 or a call outgoing to the ISDN 30 occurs, the occurrence of the call processing is indicated from the call processing/connection controller 8a to a loop-back test stopper 8f. Further, the idle/busy state of each speech channel (port) of the ISDN 30 which varies according to the above-mentioned call processing and connection control are written in an ISDN port busy table 8b in the RAM 6 by the call processing/connection controller 8a. This ISDN port busy table 8b has a number of flags indicative of the speech channel states of the ISDN 30, respectively. In this embodiment, since only a single line of the ISDN 30 is used as shown in FIG. 1, only two flags (addresses: 00 and 01) indicative of the states of two speech channels B1 and B2 included in the single ISDN line are provided in practice, and the other remaining flags are prepared for additional ISDN lines.

An interrupt signal monitor 8c generates a loop-back test start signal in response to an interrupt signal periodically generated from a timer 8d. An ISDN interface port state monitor 8e checks the states of the two speech channels B1 and B2 with reference to the ISDN port busy table 8b, when a loop-back test start signal is generated. If any one of the speech channels is in an idle state (unused), the ISDN interface port state monitor 8e informs a local CPU controller 8g, a first time switch controller 8h, and a second time switch controller 8i of the identification (ID) number of the idle channel port, in order to execute a loop-back test for the idle-state speech channel. Further, the ID number of idle channel port to which a loop-back test is to be executed is indicated to the loop-back test stopper 8f.

On the basis of the ID number of the idle channel port, the local CPU controller 8g activates an interface LSI test mode starter 8j to switch the mode of the informed idle channel in the interface LSI 18 from the service mode to the loop-back test mode. Therefore, when the B1 channel is idle for instance, the changeover switches 18b, 18c, 18f and 18g in the interface LSI 18 are set as shown in FIG. 3. Further, the first time switch controller 8h controls the time switch LSI 5 so as to connect the time slot allocated to the test pattern 1 (or 2) of the up-stream tone data highway 22 to the time slot allocated to the comparison section 10 of the down-stream speech highway 3b. Simultaneously, the first time switch controller 8h controls the RAM controller 8k so as to set RAM 10c in the write mode. Therefore, the test pattern 1 (or 2) is written in the RAM 10c via the 2M/parallel converter 10a. Upon the end of this writing operation, an end signal indicative thereof is given from the RAM controller 8k to the first and second time switch controllers 8h and 8i. Then, the first time switch controller 8h controls the time switch LSI 5 so as to connect the time slot allocated to the test pattern 1 (or 2) of the up-stream tone data highway 22 to the time slot allocated to the idle channel of the down-stream speech highway 3b. Simultaneously, the second time switch controller 8i controls the time switch LSI 5 so as to connect the time slot allocated to the idle channel of the up-stream speech highway 3a to the time slot allocated to the comparison section 10 of the down-stream speech highway 3b. Therefore, the test pattern 1 (or 2) is inputted to the ISDN interface unit 2 via the down-stream speech highway 3b, returned in the interface LSI 18, transmitted to the time switch LSI 5 via the up-stream speech highway 3a, and then inputted to the comparator 10b of the comparison section 10 via the down-stream speech highway 3b. Under these conditions, since the RAM controller 8k sets the RAM 10c in the read mode, the test pattern 1 (or 2) read from the RAM 10c is inputted to the comparator 10b. The comparator 10b compares the test pattern 1 (or 2) from the RAM 10c with the test pattern 1 (or 2) returned from the ISDN interface unit 2 via the down-stream speech highway 3b, and outputs a compared result. As described above, a loop-back test can be executed for each idle channel.

When the RAM controller 8k sets the RAM 10c to the read mode, the controller 8k simultaneously starts a comparison result receiver 81. This comparison result receiver 81 receives the compared result from the comparator 10b. When both the data do not match each other, the comparison result receiver 81 activates a terminal display controller 8m to transmit a control signal to display DATA ERROR to the predetermined terminal telephone set interface unit 25 via the data highway 4. Then, DATA ERROR is displayed on a display unit 70 of the key telephone set connected to the terminal telephone set interface unit 25. The contents of this display are the number of bits at which data error occurs, the ID number of port at which data error occurs, the test pattern number, etc. When both the data match each other, the comparison result receiver 81 gives a match signal to the loop-back test stopper 8f. Then, the loop-back test stopper 8f gives a reset signal to the interrupt signal monitor 8c, the local CPU controller 8g, the first time switch controller 8h, and the second time switch controller 8i to initialize them. Therefore, the interface LSI18 returns all the channels to the service mode, and outputting of the test pattern data to the down-stream speech highway 3b is stopped. As described above, a loop-back test for one channel is completed. The above-mentioned operation is repeated whenever the interrupt signal is generated.

Further, when a call processing relating the ISDN occurs during the loop-back test execution, a call processing occurrence is indicated from the call processing/connection controller 8a to the loop-back test stopper 8f. Then, the loop-back test stopper 8f checks whether the speech channel at which the call processing occurs is the speech channel previously designated by the ISDN interface port state monitor 8e and therefore being tested. If the checked result is YES, a reset command signal is given to the interrupt signal monitor 8c, the local CPU controller 8g, the first time switch controller 8h and the second time switch controller 8i, to stop the loop-back test now being executed.

As described above, it is possible to automatically execute the loop-back test for each speech channel of the ISDN within the key service unit, without interrupt the call processing.

In the above-mentioned embodiment according to the present invention, as far as there exist plural vacant locations corresponding to plural slots within the memory area in the tone data ROM 12, it is possible to set a plurality of test pattern data similar to the test pattern data 1 or 2. When a plurality of test pattern data are set, since it is possible to repeatedly execute the loop-back tests in accordance with the plural test pattern data in sequence under control of the main CPU 8, it is possible to realize an extremely high reliable loop-back test.

Figure 6:
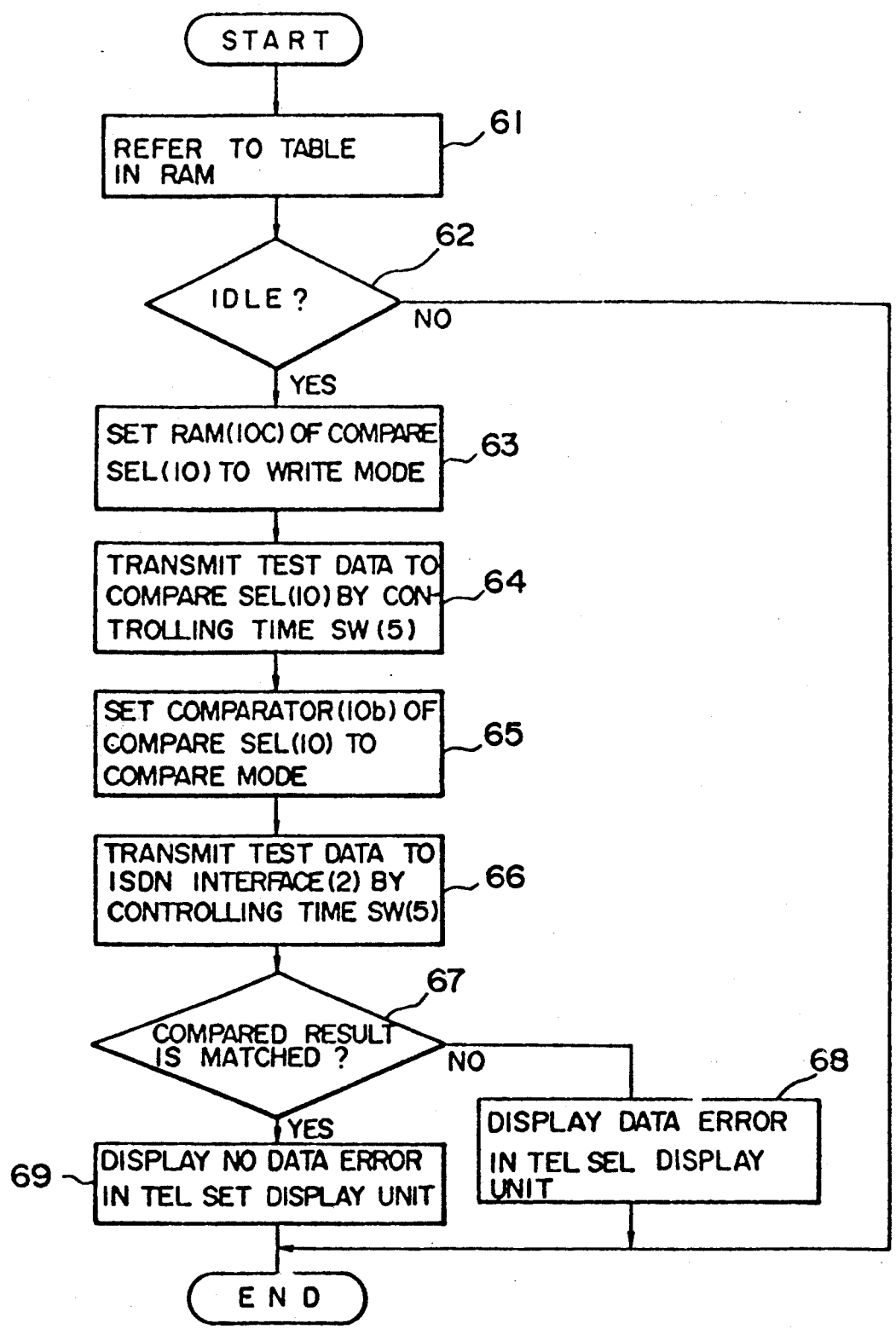
FIG. 6 is a flowchart explaining the control operation of the apparatus shown in FIG. 2.

The control operation of the above-mentioned system configuration will be explained with reference to a flowchart shown in FIG. 6.

As already explained, prior to the execution of periodic loop-back test, the main CPU 8 always refers to the idle/busy table which is stored in the RAM 6 (in step 61). As a result of reference to the idle/busy table in step 61, if the CPU recognizes that either one of the two ISDN speech channels is not used (in step 62), control proceeds to the succeeding steps to execute a loop-back test by use of the time slots allocated to the unused speech channel on the up-stream and down-stream speech highways 3a and 3b. In more detail, the main CPU 8 outputs a control signal to the local CPU 21 in order to switch the ISDN interface unit 2 from the service mode to the loop-back test mode. Subsequently, the main CPU 8 controls the comparison section 10 to set the RAM 10c to the write mode so that the test pattern data 1 or 2 outputted from the tone data ROM 12 is writable in RAM 10c (in step 63). Thereafter, the main CPU 8 controls the time switch 5 so that the time slot allocated to the test pattern data 1 or 2 of the up-stream tone data highway 22 is connected to the time slot allocated to the comparison section 10 of the down-stream speech highway 3b in order to write the test pattern data 1 or 2 outputted from the tone data ROM 12 into the RAM 10c (in step 64). Upon writing operation completion, the main CPU 8 controls the comparison section 10 to set the RAM 10c to the read mode and the comparator 10b to the comparison mode (in step 65). At the same time, the main CPU 8 controls the time switch 5 so that the time slot allocated to the test pattern data 1 or 2 of the up-stream tone data highway 22 is connected to the time slots allocated to the unused channel of the down-stream speech highway 3b, and additionally the time slot allocated to the unused channel of the up-stream speech highway 3a is connected to the time slot allocated to the comparison section 10 of the down-stream speech highway 3b. Accordingly, the test pattern data 1 or 2 returned from the interface LSI 18 is inputted to the comparison section 10, and then compared with the test pattern data 1 or 2 read from the RAM 10c (in steps 66 and 67). As a result of comparison, when all the bits of both the data match with each other and therefore a match signal is outputted from the comparator 10b (in step 67), NO DATA ERROR is displayed on the display unit of a previously designated key telephone set 27 (in step 69). On the other hand, when a mismatch signal is outputted from the comparator 10b, the number of bits at which data error occurs, the number of channel port at which data error occurs, and the test pattern data 1 (or 2) by which data error occurs are displayed on the display unit of the previously designated key telephone set 27 (in step 68). A first loop-back test routine ends as described above.

As apparent from the above description, in the embodiment of the present invention, since it is possible to execute a loop-back test by use of an idle speech channel (now not being used) of the two speech channels, it is unnecessary to momentarily stop the service operation of the key telephone system for each loop-back test. Further, when a call incoming or a call originating occurs relating the idle speech channel during the loop-back test execution, since the mode of the idle channel is switched immediately from the loop-back test mode to the ordinary service mode, there exists no problem with respect to call processing and conversation.

What is claimed is:

1. An apparatus for detecting data errors occurring in a key service unit of a key telephone system connectable to an ISDN, the key service unit including up-stream and down-stream speech highways each having a plurality of time slots including time slots allocated to speech channels of the ISDN, a time switch for transferring data from each time slot of the up-stream speech highway to each time slot of the down-stream speech highway, an ISDN interface unit provided between the ISDN and the up-stream and down-stream speech highways, for transmitting data received from the speech channels of the ISDN to the time slots of the up-stream speech highway allocated to the speech channels and transmitting data received from the time slots of the down-stream speech highway allocated to the speech channels to speech channels of the ISDN, which comprises:
  (a) detecting means for detecting an unused speech channel of the speech channels of the ISDN;
  (b) test starting means for generating a loop-back test start signal;
  (c) test data outputting means responsive to the loop-back test start signal, for outputting a predetermined test data to the time slot of the down-stream speech highway allocated to the unused speech channel detected by said detecting means;
  (d) loop-back route forming means responsive to the loop-back test start signal, for forming in the ISDN interface unit a loop-back route through which the test data received from the time slot of the down-stream speech highway allocated to the unused speech channel are transmitted to the time slot of the up-stream speech highway allocated to the unused speech channel;
  (e) discriminating means for storing test data the same as the test data outputted from said test data outputting means and discriminating whether data error occurs or not by receiving the test data transmitted to the up-stream speech highway through the loop-back route and by comparing the received test data with the stored test data; and
  (f) test stopping means for stopping the test data from being outputted to the down speech highway and releasing the formed loop-back route, upon detecting an occurrence of call processing related to the unused speech channel of the ISDN.

2. The apparatus for detecting data error of claim 1, which further comprises display means for displaying a result discriminated by said discriminating means.

3. The apparatus for detecting data errors of claim 1, wherein said test start means generates the loop-back test start signal periodically.

4. The apparatus for detecting data errors of claim 1, wherein said test data outputting means comprises:
  (a) a memory for storing the test data and outputting the stored test data;
  (b) a tone data highway for transmitting the test data outputted from said memory to the time switch; and
  (c) time switch control means responsive to the loop-back test start signal, for controlling the time switch so as to transfer the test data from the tone data highway to the time slot of the down-stream speech highway allocated to the unused speech channel.

5. The apparatus for detecting data errors of claim 1, wherein said loop-back route forming means comprises:
  (a) first and second change-over switching means provided in the ISDN interface unit, said first change-over switching means selecting whether the data received from the time slot of the down-stream speech highway allocated to each of the speech channels are transmitted to each of the speech channels or to said second change-over switching means, and said second change-over switching means selecting either data transmitted from each of the speech channels of the ISDN or data transmitted from said first change-over switching means to transmit the selected data to the time slot of the up-stream speech highway allocated to each of the speech channels; and
  (b) switch control means responsive to the loop-back start signal, for controlling said first and second change-over switching means so that the loop-back route is formed to transmit the test data from the down-stream speech highway to the up-stream speech highway passing through said first change-over switching means and said second change-over switching means in sequence.

6. The system for detecting data errors of claim 1, wherein said discriminating means comprises:
  (a) a memory for storing test data the same as that outputted from said test data outputting means; and
  (b) comparing means for receiving the test data transmitted from the ISDN interface unit to the up-stream speech highway and comparing the received test data with the stored test data read-out from said memory.

7. The system for detecting data errors of claim 1, wherein the down-stream speech highway further comprises a time slot allocated to said discriminating means; said test data outputting means comprises:
  (a) a first memory for previously storing the test data and outputting the stored test data;
  (b) a tone data highway for transmitting the test data outputted from said first memory to said time switch; and
  (c) first time switch control means responsive to the loop-back test start signal, for controlling the time switch so as to transfer the test data from the tone data highway to the time slot of the down-stream speech highway allocated to said discriminating means and thereafter to the time slot of the down-stream speech highway allocated to the unused speech channel; and
  said discriminating means comprises:

(a) a second memory for receiving the test data transferred from the tone data highway to the time slot of the down-stream speech highway allocated to said discriminating means and storing the received data;

(b) second time switch control means for controlling said time switch, after the test data has been stored in said second memory, so as to transfer the test data from the time slot of the up-stream speech highway allocated to the unused speech channel to the time slot of the down-stream speech highway allocated to said discriminating means; and (c) comparing means for receiving the test data transferred from the time slot of the up-stream speech highway allocated to the unused speech channel to the time slot of the down-stream speech highway allocated to said discriminating means, and comparing the received test data with the test data stored in said second memory.

8. A method for detecting data errors in a key service unit of a key telephone system connectable to an ISDN, the key service unit including up-stream and down-stream speech highways each having a plurality of time slots including time slots allocated to speech channels of the ISDN, a time switch for transferring data from each time slot on the up-stream speech highway to each time slot of the down-stream speech highway, an ISDN interface unit provided between the ISDN and the up-stream and down-stream speech highways, for transmitting data received from the speech channels of the ISDN to the time slots of the up-stream speech highway allocated to the speech channels and transmitting data received from the time slots of the down-stream speech highway allocated to the speech channels to the speech channels of the ISDN, which comprises the steps of:

(a) detecting an unused speech channel of the speech channels of the ISDN;

(b) generating a loop-back test start signal;

(c) in response to the loop-back test start signal, outputting a predetermined test data to the time slot of the down-stream speech highway allocated to the unused speech channel detected by said detecting means;

(d) in response to the loop-back test start signal, forming in the ISDN interface unit a loop-back route through which the test data received from the time slot of the down-stream speech highway allocated to the unused speech channel are transmitted to the time slot of the up-stream speech highway allocated to the unused speech channel;

(e) discriminating whether data error occurs or not by comparing the test data outputted to the down-stream speech highway with the test data transmitted from the down-stream speech highway to the up-stream speech highway through the formed loop-back route; and (f) stopping the test data from being outputted to the down speech highway and releasing the formed loop-back route, upon detecting an occurrence of call processing related to the unused speech channel of the ISDN.

* * * * *